United States Patent [19]
Rosinski et al.

[11] Patent Number: 5,793,308
[45] Date of Patent: Aug. 11, 1998

[54] VEHICULAR POSITION MONITORING SYSTEM WITH INTEGRAL MIRROR VIDEO DISPLAY

[75] Inventors: Albin Rosinski, Cedar; Joseph Wisniewski, Maple City; Dale R. Gauthier, Cedar, all of Mich.

[73] Assignee: Sensorvision Technologies, L.L.C., Chicago, Ill.

[21] Appl. No.: 229,607

[22] Filed: Apr. 12, 1994

(Under 37 CFR 1.47)

Related U.S. Application Data

[63] Continuation-in-part of Ser. No. 908,267, Jul. 2, 1992, Pat. No. 5,303,205.

[51] Int. Cl.⁶ .................................................. G08G 1/16
[52] U.S. Cl. .................. 340/903; 340/436; 359/549; 348/113; 367/108
[58] Field of Search ........................ 340/436, 903, 340/937; 359/549, 609, 631, 838; 348/113, 115; 367/108, 109

[56] References Cited

U.S. PATENT DOCUMENTS

| Re. 32,576 | 1/1988 | Pastore | 359/636 |
|---|---|---|---|
| D. 299,491 | 1/1989 | Masuda | D12/188 |
| 4,626,850 | 12/1986 | Chey | 340/903 |
| 4,674,073 | 6/1987 | Naruse | 367/105 |
| 4,882,565 | 11/1989 | Gallmeyer | 340/461 |
| 4,903,004 | 2/1990 | Starke et al. | 340/425.5 |
| 4,937,796 | 6/1990 | Tendler | 367/116 |
| 4,943,796 | 7/1990 | Lee | 340/435 |
| 4,968,124 | 11/1990 | Deckert et al. | 359/435 |
| 5,016,996 | 5/1991 | Ueno | 359/838 |
| 5,037,182 | 8/1991 | Groves et al. | 359/630 |
| 5,144,661 | 9/1992 | Shamosh et al. | 340/540 |

*Primary Examiner*—Jeffery Hofsass
*Assistant Examiner*—Daryl C. Pope
*Attorney, Agent, or Firm*—Lowe Hauptman Gopstein & Berner

[57] ABSTRACT

A vehicular position monitoring system includes an integral mirror video display. The display is capable of showing various fields of vision from various parts of the vehicle and can be strobed by the vehicle operator. The position monitoring system can be combined with a distance measurement system so that alpha-numeric graphics of distance between a vehicle and an object behind the vehicle can be displayed with the video image of regions seen from various points on the vehicle.

34 Claims, 19 Drawing Sheets

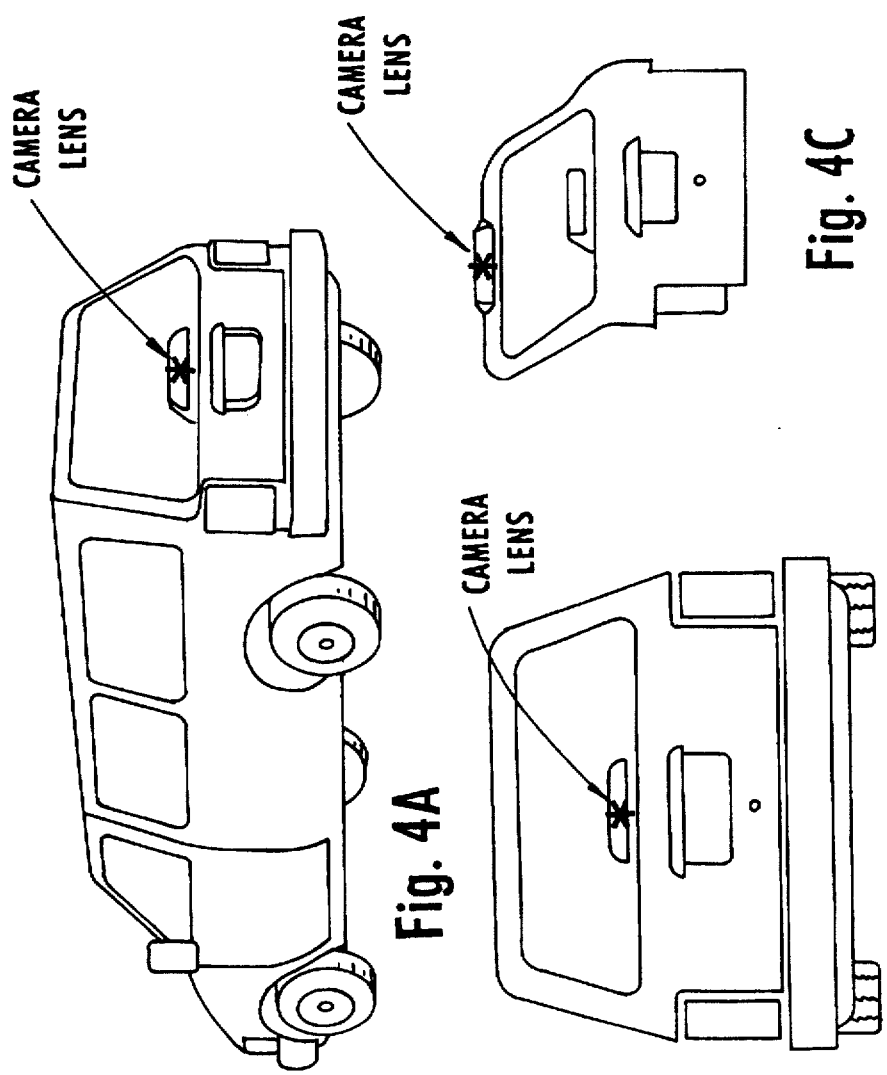

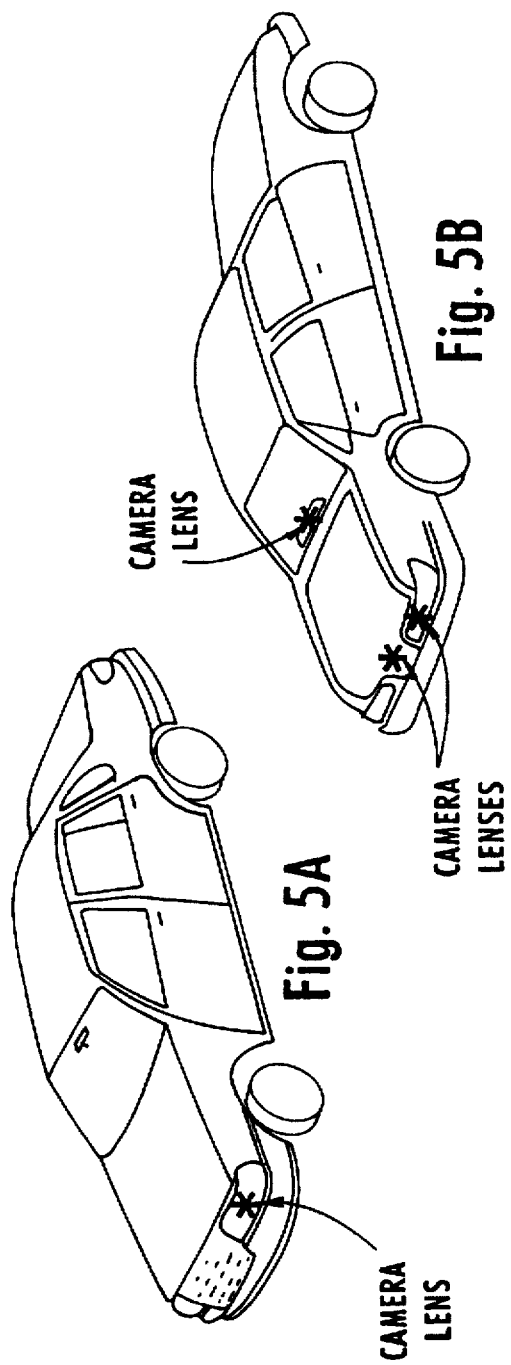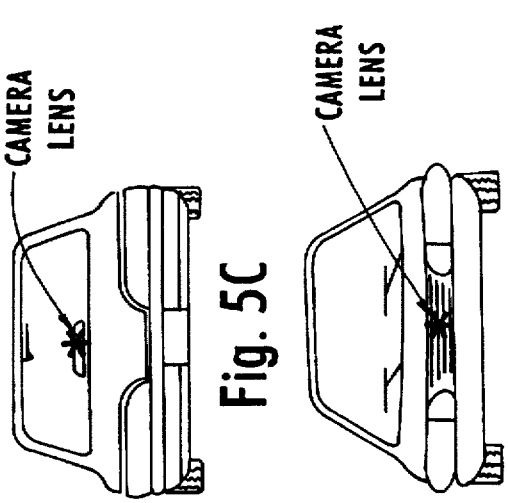

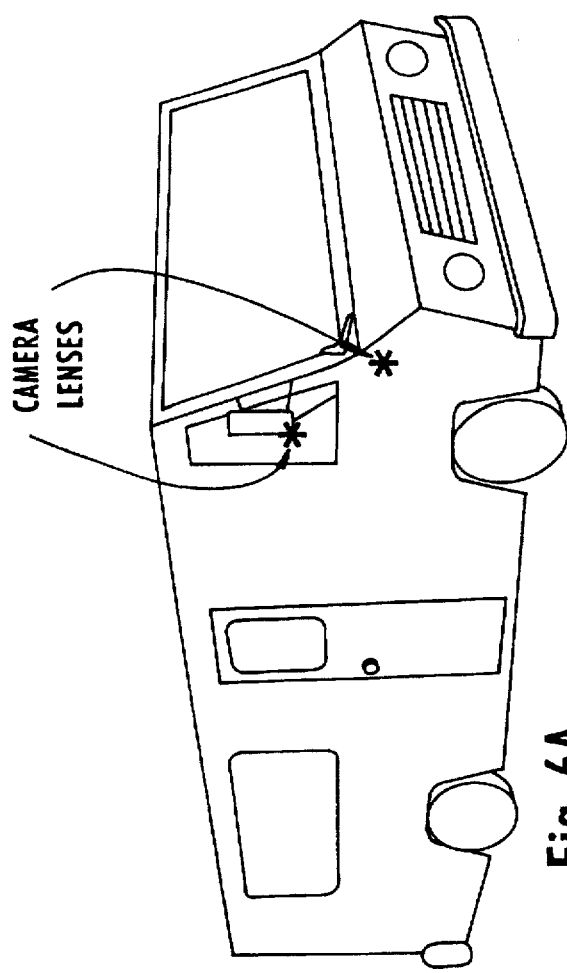
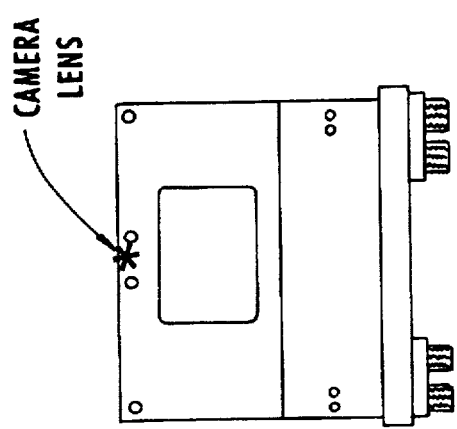
Fig. 6A
Fig. 6B

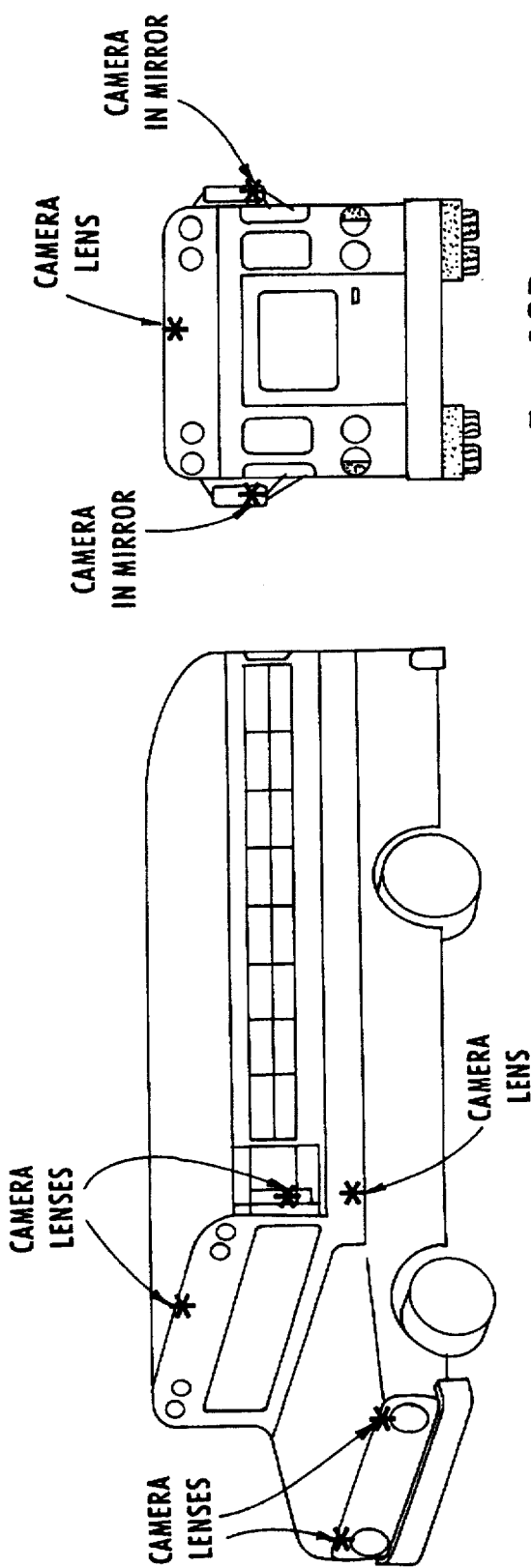
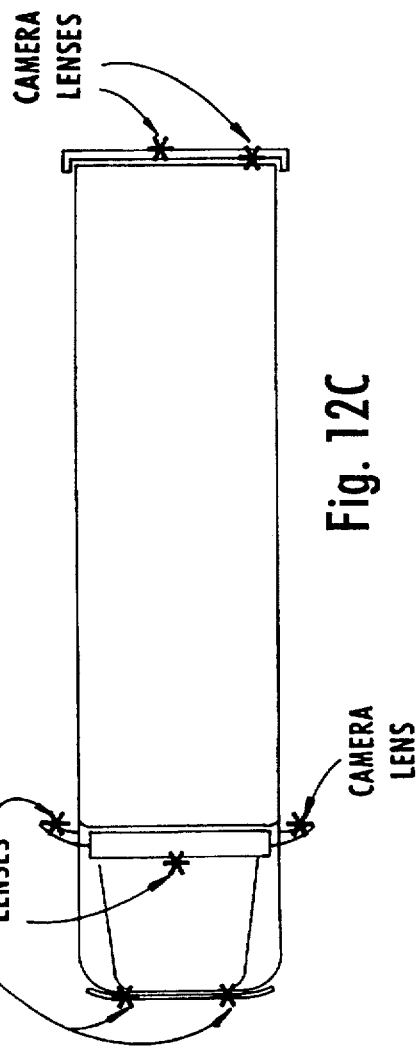
Fig. 12A
Fig. 12B
Fig. 12C

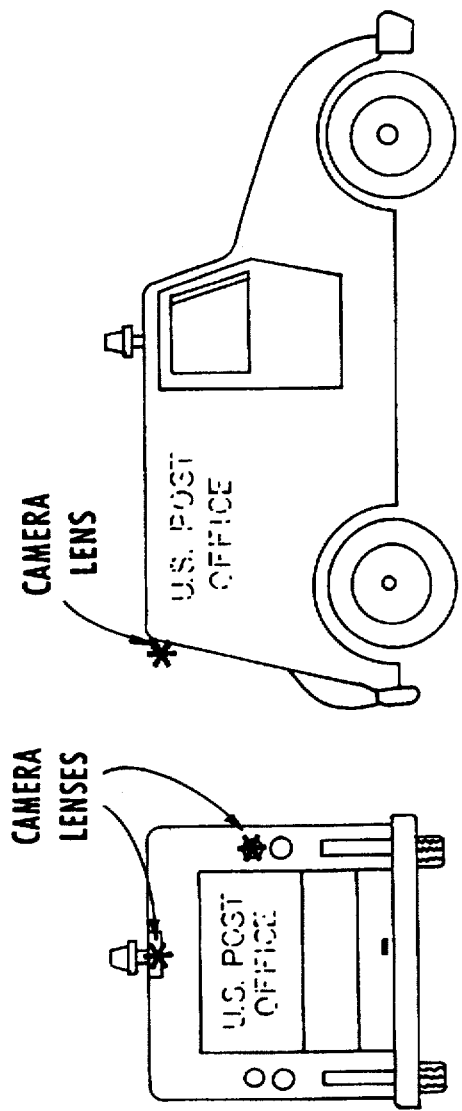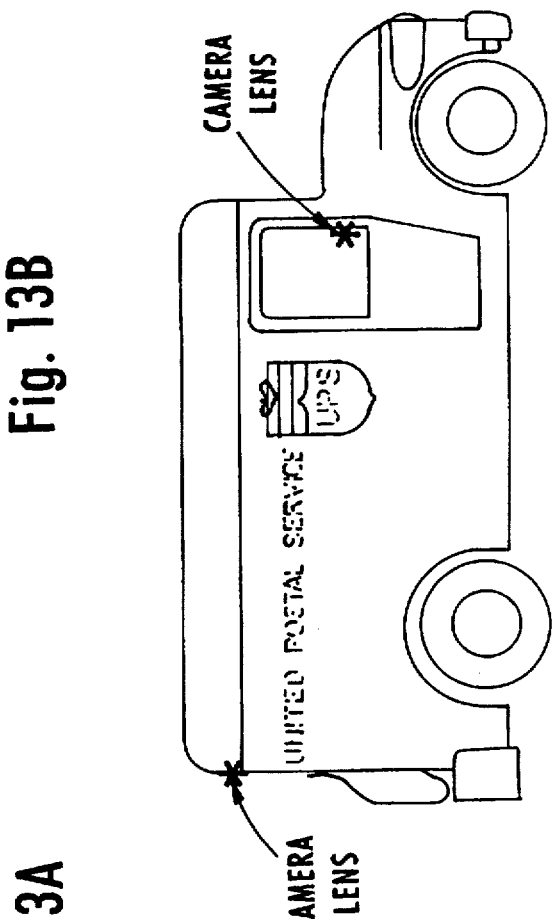

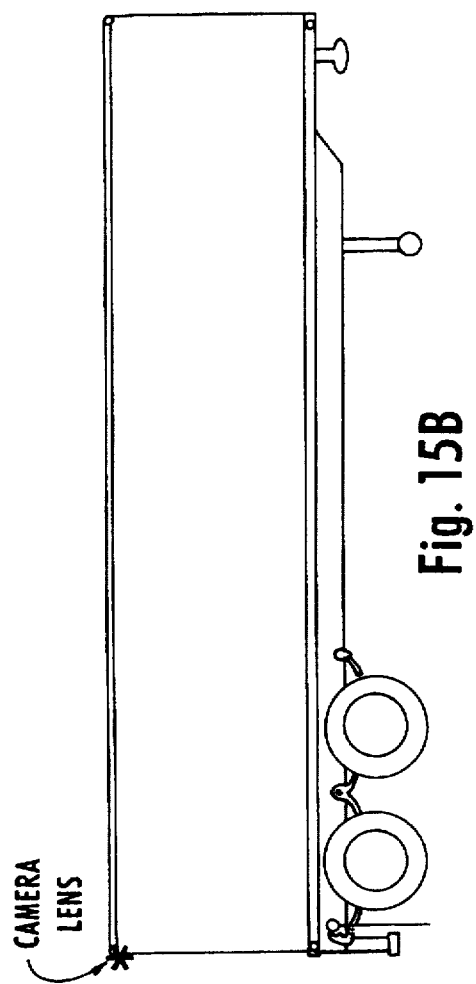
Fig. 15B
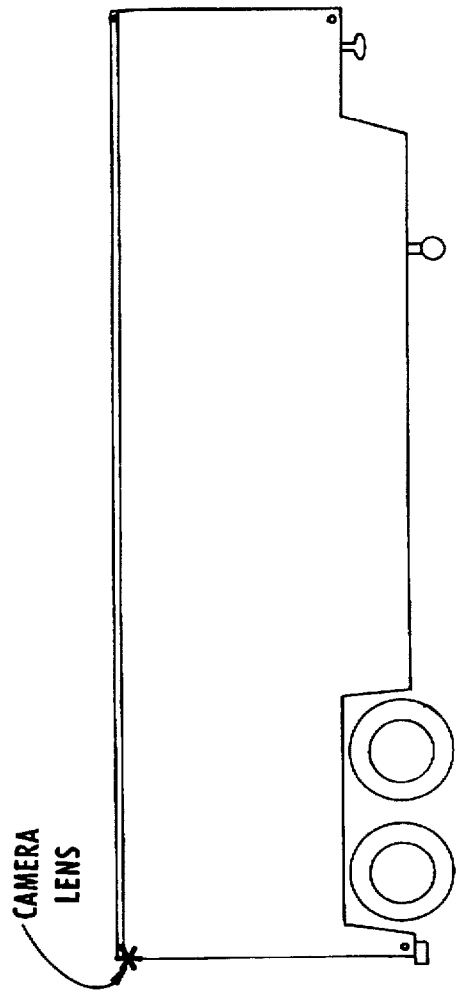
Fig. 15E
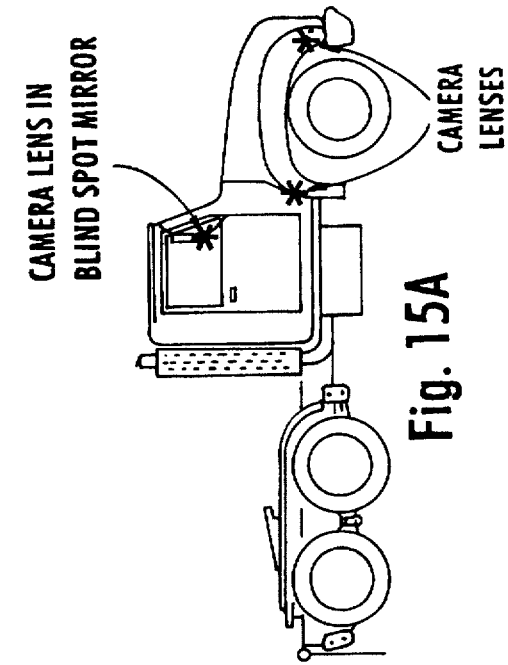
Fig. 15A
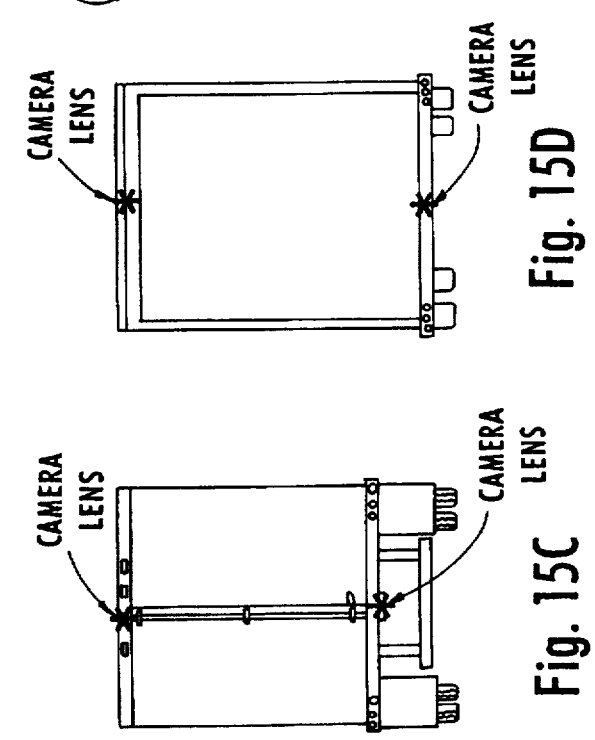
Fig. 15D
Fig. 15C

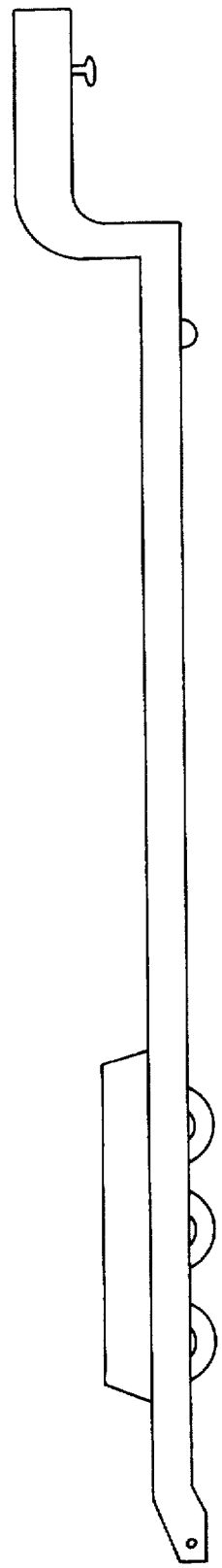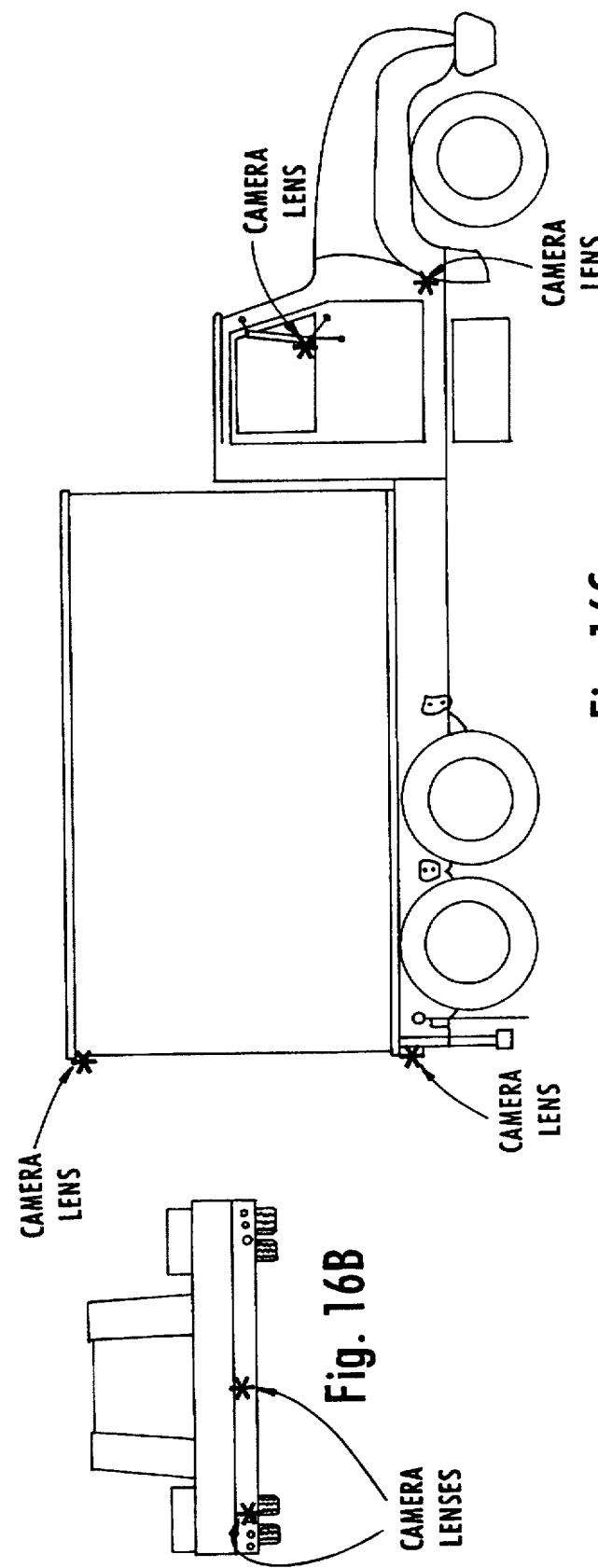

VEHICULAR POSITION MONITORING SYSTEM WITH INTEGRAL MIRROR VIDEO DISPLAY

This is a Continuation-In-Part of application Ser. No. 07/908,267 filed Apr. 12, 1993, now U.S. Pat. No. 5,303,205.

TECHNICAL FIELD

This system relates to vehicle rear view systems, and more specifically to an electronic system having a video display integrated into a vehicle rear view mirror, where the display depicts images as viewed from the rear of the vehicle.

BACKGROUND ART

While modern vehicle design provides an operator satisfactory forward visibility during vehicle operation, vision in side and rear directions is often obstructed. To some extent operator vision is augmented by proper placement of mirrors on the vehicle. However, mirrors do not completely eliminate blind spots. For example, it is difficult to provide a satisfactory view toward the rear of a vehicle using mirrors due to obstructions caused by the body of the vehicle. Operator vision toward the rear of the vehicle is further impeded by the relatively large distance from the operator position to the rear of the vehicle common to tractor-trailer combinations and other large vehicles.

Mirrors further limit visual clues necessary for operator judgment of distance to an obstruction by limiting operator depth perception. This is a particular problem when backing a vehicle when the operator requires accurate distance information to maneuver a vehicle (e.g., a semi-tractor trailer) toward an obstruction such as a loading dock. Because of the relatively large distance between the operator and the rear of the vehicle, smaller obstructions may go unnoticed. This is also true in blind areas on either side of a vehicle where direct driver observation is not possible and mirror systems provide incomplete coverage resulting in "blind spots".

Various systems have been proposed in addition to mirrors to augment operator vision. These systems include visual systems using television cameras and monitors to allow visual observation of areas not viewable through mirrors. Television augmentation is relatively expensive, requires the operator to divert his or her attention from other visual systems, and provides limited clues to determine distance to an obstruction.

Electronic obstruction detecting and ranging systems use ultrasonic, radar and infrared emitters and receivers to bounce energy off an obstruction. The systems measure the time required for the emitted energy to travel to and from the obstruction to determine a distance to the obstruction.

Starke et al. U.S. Pat. No. 4,903,004, incorporated herein by reference, describes a distance measuring and signalling system for a vehicle for measuring distances to obstructions such as behind a vehicle being backed up. An array of transducers are mounted on a support such as a rear bumper of the vehicle. A pulsed signal is timed as it is converted to an ultrasonic wave signal and its echo detected. The calculated distance is displayed on a three digit display mounted on a dashboard of the vehicle. The system includes ultrasonic transmitting/receiving units, a control unit and a digital display unit.

Tendler U.S. Pat. No. 4,937,796 describes a method and apparatus for providing a voice alert to a vehicle operator. The apparatus uses sonar to detect a distance from the rear of a vehicle to a structure such as a loading dock to which the vehicle is being backed. A device converts a detected range into an audible call out of the distance from the back of the vehicle to the structure.

Naruse U.S. Pat. No. 4,674,073 describes an apparatus for use in a vehicle for ultrasonically locating and ranging an object in relation to the vehicle. A plurality of ultrasonic transmitting and receiving elements are alternately arranged in a linear array and sequentially activated to detect and locate an object. A digital display shows the location and distance to a detected object.

Chey U.S. Pat. No. 4,626,850 describes an apparatus for use in a vehicle for ultrasonically locating and ranging an object in the vicinity of the vehicle. An ultrasonic transducer is rotated in azimuth to scan an area for objects. Audio and visual display of distance and direction to a detected object are provided.

Lee U.S. Pat. No. 4,943,796 describes a display unit attachable to an inside rear view mirror of an automobile for displaying distance to an object behind the vehicle using ultrasonic sensors.

While the prior art describes ultrasonic detection and ranging devices, conventional visual distance displays require the vehicle operator to divert attention away from other systems to observe the device display. Although Lee describes a display mounted on an inside mirror so that a distance display is observable near the mirror, the system still requires the vehicle operator to divert his or her vision from the mirror to the attached display. Further, this latter system is not usable with tractor-trailer combinations not having an inside rear view mirror.

Other surveillance systems are available, such as that disclosed in U.S. Pat. No. 4,968,124 to Deckert et al. This patent includes a system for use on large vehicles to remove blind spots. This system includes an image relay portion using conventional fiber optical cables or a periscope assembly mounted between two fiber optic cables to extend image transmission. The periscope assembly utilizes a lens assembly to relay images. The viewer assembly is mountable in an easy-to-see location on the vehicle. The imaging assembly (optical) does not include electronic imagers. This assembly is confined to optical components. Transmission of the images is confined to the use of optical fiber cables. To utilize this system while backing a vehicle, an operator must move his gaze between the rear view mirror and the display of the Deckert et al. system. Further, because of the nature of the optical assemblies involved, the view available to the driver from a single assembly is limited. Multiple assemblies are necessary.

Head-up indication, such as instrument displays, are well known. U.S. Pat. No. 5,037,182 to Groves et al. includes a self-contained interior rear view mirror providing a head-up display image of vehicle information for the vehicle operator. The same type of display in conjunction with a vehicle mirror is disclosed in U.S. Pat. No. 4,882,565 to Gallmeyer, U.S. Pat. No. RE 32,576 to Pastore, U.S. Pat. No. 5,016,996 to Ueno, U.S. Pat. No. 5,124,845, to Shimojo, U.S. Pat. No. 5,207,492 to Roberts, U.S. Pat. No. 5,189,537 to O'Farrell, and U.S. Pat. No. 5,210,967 to Brown.

None of these systems provides a view of the rear portion of the vehicle not already viewable with the standard rear view mirror. Consequently, none of these systems aids in allowing a vehicle operator to view blind spots at the rear end sides of the vehicle while still using the vehicle rear view mirror.

Another system included in U.S. Pat. No. 5,027,200 to Petrossian et al. apparently utilizes cameras in place of side view mirrors. However, for the vehicle operator to take advantage of the view exhibited by the cameras, he must look away from the normal rear view mirror. Thus, the vehicle operator faces problems inherent in switching observations from one piece of equipment to another.

Viewing vehicle blind spots while utilizing the normal viewing range of rear view mirrors is not accomplished in any of the aforementioned prior art systems. Thus, vehicle operation with these systems is not as safe or as pleasant as it might be.

DISCLOSURE OF THE INVENTION

Accordingly, it is one object of the present invention to solve the problems inherent to the aforementioned prior art system by providing a system allowing a vehicle operator to utilize the normal field of view of a side view mirror and still view "blind spots" normally unviewable through the standard side view mirror.

It is another object of the present invention to provide a system in which a vehicle operator does not have to move his glance from a single rear view mirror in order to scan the entire field of vision to the rear and sides of a vehicle.

It is yet another object of the present invention to provide a system in which a vehicle operator can utilize a single side view mirror to view a plurality of different fields of vision normally unavailable to that side view mirror.

It is still a further object of the present invention to provide a system capable of recording various fields of vision to the rear of a vehicle while the vehicle is being operated in reverse.

It is yet an additional object of the present invention to provide a vehicle operator with a field of vision normally not available to a rear view mirror being used by the operator, along with graphics superimposed over the additional field of vision to provide additional information to the vehicle operator.

These and other objects of the present invention are achieved by a vehicle position monitoring system mounted on the vehicle wherein the system includes means for generating an image such as a camera. The system also includes a vehicle rear view mirror having a reflecting surface with a window portion location therein. A video display is mounted on the mirror and viewable through the window portion. A controller is arranged to connect the video display so that subject image is displayed to the vehicle operator.

The goal of vehicle safety is achieved by the following inventive method of monitoring a vehicle position during a backing operation. This method includes viewing a rear view mirror and viewing a display within that mirror to obtain a field of vision not normally available to the rear view mirror.

The foregoing and other objects, features, aspects and advantages of the present invention will be more apparent from the following detailed description when taken in conjunction with the accompanying drawings.

BRIEF DESCRIPTION OF DRAWINGS

FIGS. 4A–16C are drawings depicting various mounting points for the imagers or cameras of the present invention.

BEST MODE FOR CARRYING OUT THE INVENTION

Figure 1:
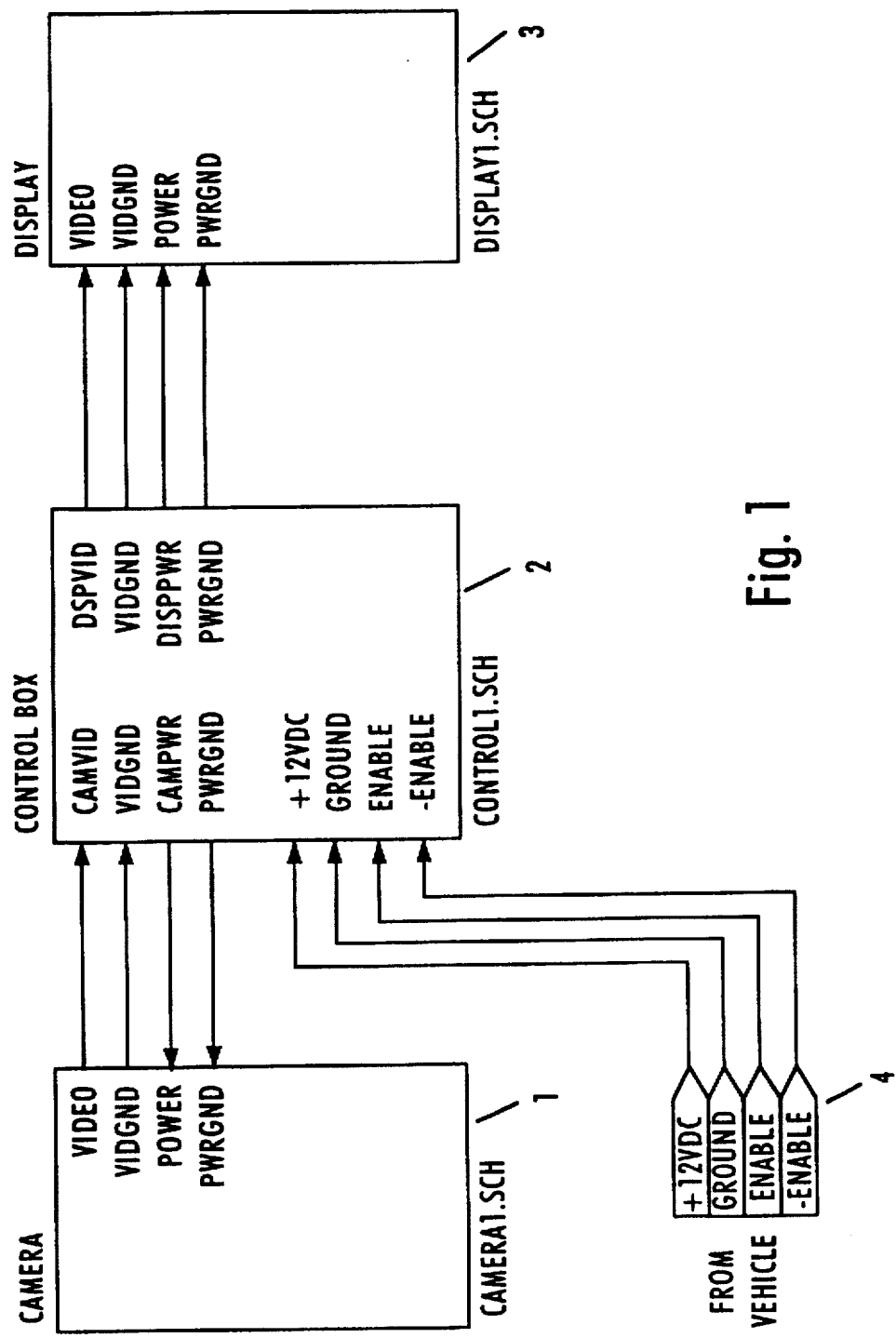
FIG. 1 is a block diagram including wiring designations of the basic system of the present invention.

FIG. 1 is a block diagram of the basic system of the present invention including certain control connections.

Imager 1 is preferably a charge coupled device (CCD) type electronic CCD camera. It must be small enough to fit into a tail light of a vehicle if desired, and rugged enough to withstand the vibrations of a moving vehicle. The camera must be completely sealed for moisture to avoid compromising the camera operation. The camera must have high resolution and preferably a 90° angle of view. The camera should focus from one-half inch to infinity for best results. Preferably an auto brightness control and a light source for operation in the dark will also be included.

However, the camera can be one having a high sensitivity to infrared radiation. If this is the case, the light source for operation in the dark may not be necessary. Preferably the system will include multiple cameras to cover all possible blind spots for the type of vehicle using the system.

As an alternative to the CCD cameras, the imagers can be constituted by optical light focusing devices, such as lenses (not shown). These are connected via optical fiber to a single charged coupled device imager chip or chip camera located inside the vehicle, preferably near the control box 2. This chip camera is then connected to the control box in the same manner as camera 1 located on the exterior of the vehicle. Multiple imagers are accommodated using multiple fiber optical cables. Single imagers and their respective field of view are selected using lens shutters. The shutters for the non-selected imagers are closed while that of the selected imager is open. These are mechanical shutters and are controlled from the control box 2 to which is responsive to vehicle operator selection. This technique of handling multiple mechanical shutters is well known in this art. Consequently, a detailed description of this arrangement is not given in this application. This is also true for the technique of using fiber optic cables to transfer light gathered from a lens system to a remote location for viewing.

Either of the imager arrangements is preferably operated with imagers (lenses or cameras) located as shown in FIGS. 4–16. Further, each system is preferably used with fish-eye lenses to obtain a maximum field of vision for each imager.

A control box 2 includes the central processing unit (shown as 21 in FIG. 2) which can be constituted by any number of different microcomputer arrangements. Preferably, the central processing unit (CPU) contains subprocessors or single chip microcomputers to carry out subordinate functions. The CPU will preferably have the power requisite for the number of functions being carried out. This is dependent upon the number of cameras, the type of recording device (to be described, infra.), the number of mechanical shutters to be controlled (if present), and the presence and number of rotating mounts for the cameras.

The CPU also controls all aspects of system set-up as dictated by the vehicle operator. This includes the type of scanning to be done from camera-to-camera, the type of scanning to be done by rotating camera mounts (if present), the configuration of split screens on the display, the use of graphics to be combined with the video display, and the integration of the output of an ultrasonic distance measuring device with the video display 3. The control box provides menus displayed to the vehicle operator to make the necessary selections for the operation of the present invention. If the camera has a high sensitivity to infrared radiation, CPU will determine if a high level of infrared radiation exists so that an alarm can be sounded to warn of the presence of a "warm body", such as a human or an animal, behind the vehicle.

The CPU module is also designed to acknowledge different devices as they are plugged into the CPU. A failure of any of those devices would result in an error code indicated on electronic video display 3. Operator adjustments to the system can be made via infrared remote control through the control module 2. This permits less dashboard space in the vehicle to be used, and provides greater convenience to the vehicle operator. Normally, the control box containing the control module mounts under the dashboard of the vehicle.

The menus controlled by the CPU allow the vehicle operator to select the mode of operation as well as some of the preprogrammed routines. The menu will also display time and date. It is also possible to superimpose the graphics for the menu (or a distance measurement device if present) onto the video display.

The arrangement of the mirror and the video display contained therein is as shown in the parent of the present application, U.S. Ser. No. 07/908,267, now U.S. Pat. No. 5,303,205. The difference between the mirror and display of the present application and that of the drawings shown in the parent application is that only a single window is needed for the video display of the present application. In contrast, the drawings of the parent application depict two windows for illustrating all of the data for the distance measurement system. In the present invention, the video display 3 is preferably a four inch diagonal color liquid crystal device. The display 3 is mounted within the mirror as is done in the parent application. The video display is visible only when enabled since it is covered with one-way mirror glass such as a pellicle mirror.

Because of the size of the video display (2.828 inches on each side), the video display is preferably mounted within a side view mirror located on the exterior of the vehicle. However, smaller displays could be mounted on the standard rear view mirrors contained within the vehicle. The exterior mirror assembly includes a hood to reduce glare and is completely sealed from moisture and other environmental elements that could compromise the operation of the video display. To further reduce the chances of moisture contamination of the interior of the mirror housing, a heater is arranged in the housing to prevent condensation. Further details of mirror mounting and additional characteristics of the mirror housing are disclosed in the parent application.

Figure 2:
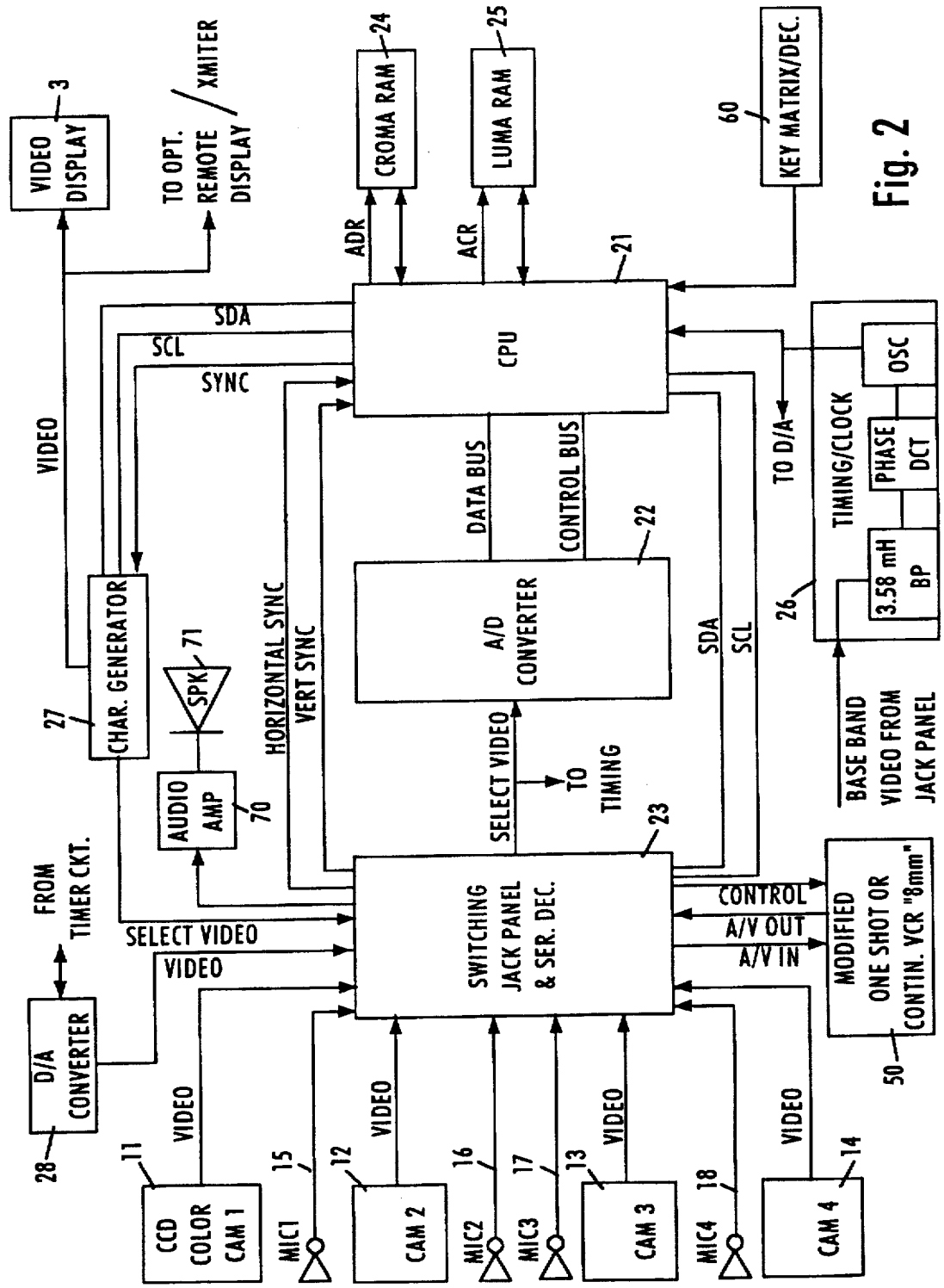
FIG. 2 is a circuit diagram of a four-camera embodiment of the present invention.

The electronic imagers and the liquid crystal display (LCD) type electronic video display can be color devices as indicated in FIG. 2. This figure depicts an arrangement with four color cameras including an eight millimeter video cassette recorder 50 for storing images from the camera for later study. The arrangement of FIG. 2 also includes a character generator 27 used to provide graphic figures to combine with the video display. The video display as well as the characters generated as part of the display can be sent to a remote display by means of a transmitter (not shown).

Characters generated for combination with the overall video display can depict such information as distance between the rear of the vehicle and a detected object. Such information is provided by way of an ultrasonic distance measuring system as described in U.S. application Ser. No. 08/012,827, hereby incorporated by reference. The output of such a system is fed to CPU 21, and the relevant information sent from the CPU 21 to character generator 27 to provide the digital output normally provided by the distance measurement device itself. The digital characters from the distance measurement devices are combined as part of the video display 3. Further, the parent application, now U.S. Pat. No. 5,303,205, also discloses an ultrasonic distance measurement system, but without the detail of Ser. No. 08/012,827. Either type of system can be applied to the present invention since CPU 21 can handle the output of either type of system and provide the appropriate control signals for character generator 27.

The use of graphics with video display 3 is permitted because of the nature of the active matrix LCD used for video display 3. Normally a total screen display is made up of 410,000 pixels, where a pixel is the smallest known picture element. Each pixel is composed of a red, green and blue light-emitting transistor. When all three are equally illuminated, an apparent white or gray light will be seen. Most colors of the spectrum can be produced by varying the brightness of each transistor. Therefore, to superimpose graphics on video from cameras, the luminance signals are added together and applied to the display.

For example, if a camera is focused on a green object and red graphics are added, a pixel that is displaying graphics and camera video would have the green and red transistors illuminated, while the blue transistor would be off. As a result, amber light would be produced in the area where the graphics are displayed. However, this type of graphic can be difficult to see in brightly lit areas, or in areas of the same color as the screen. Consequently, to combat this problem, the CPU blanks out (turns off) all pixels in an area constituting the character to be displayed. In order to further enhance readability, slightly more pixels are blanked than are needed to fully constitute the character. Another approach to enhance the readability of graphics is to use one color for the main body of the graphic while surrounding it with a small black border (caused by blanked pixels).

The digitized video signals can be displayed as a single frame or as four different frames on the subdivided video display 3. Further, the present system has the capacity to sub-divide the video display into eight different frames so that a view from eight different cameras can be shown to a vehicle operator. However, such sub-division becomes problematical unless the size of the video display is increased. Even then, eight different pictures can be confusing to a vehicle operator who is currently attempting to back a large vehicle into a small space. Thus, four frames has been found to be the optimum number for operator convenience.

Using key matrix 60, the vehicle operator can provide commands to the CPU 21 to "strobe" images from each of the cameras 11, 12, 13 and 14 onto the video display, or can request that the image from each camera be displayed on one-quarter of the sub-divided video display. Composite video signals from the cameras 11, 12, 13 and 14 are routed into a switching jack panel used for I/O switching purposes. Timing of the I/O process is controlled by timing clock 26 which sends timing signals through D/A converter 28 into the switching jack panel. The VCR 50 is also fed from the panel 23 as is the audio amplifier 70 and speaker 71. Video data is stored in chrominance RAM 24 and luminance RAM 25, both connected to the CPU 21. An analog-to-digital converter 22 converts and conveys data from the cameras to the CPU 21.

Microphones 15, 16, 17 and 18 are also mounted on the exterior of the vehicle, and can be co-located with corresponding cameras. Outputs from these microphones are fed to the jack panel 23 and from there to the audio amplifier 70 and the speaker 71 located in the vehicle operator space. As a result, the vehicle operator is often able to detect activity behind the vehicle even if it cannot be seen clearly. Speaker 71 is also used to convey an audible alarm to the vehicle operator if CPU 21 detects a sufficient level of infrared radiation from any of the cameras. Thus, an additional level of safety is achieved even in very dark environments since the heat from a human or an animal can be detected by cameras having some infrared sensitivity.

The CPU 21 also provides a menu, viewable on the video display 3 to the vehicle operator. This menu can be used by the operator to control every aspect of system operation. Parts of the menu can even be displayed while the cameras are providing a video display of the exterior of the vehicle to the vehicle operator. This is done as previously described by isolating part of the screen for graphic alpha-numeric use as opposed to a video display. The control for such use comes from CPU 21 and is well known in the art of video manipulation.

The VCR 50 can be eight millimeter, or any other type that is found to be appropriate for use with a vehicle position monitoring system. The VCR can be pulsed or run continuously. The purpose of the VCR is to provide records of vehicle activity during certain critical moments, and can be used by vehicle operators before attempting questionable maneuvers that have been previously recorded.

Figure 3:
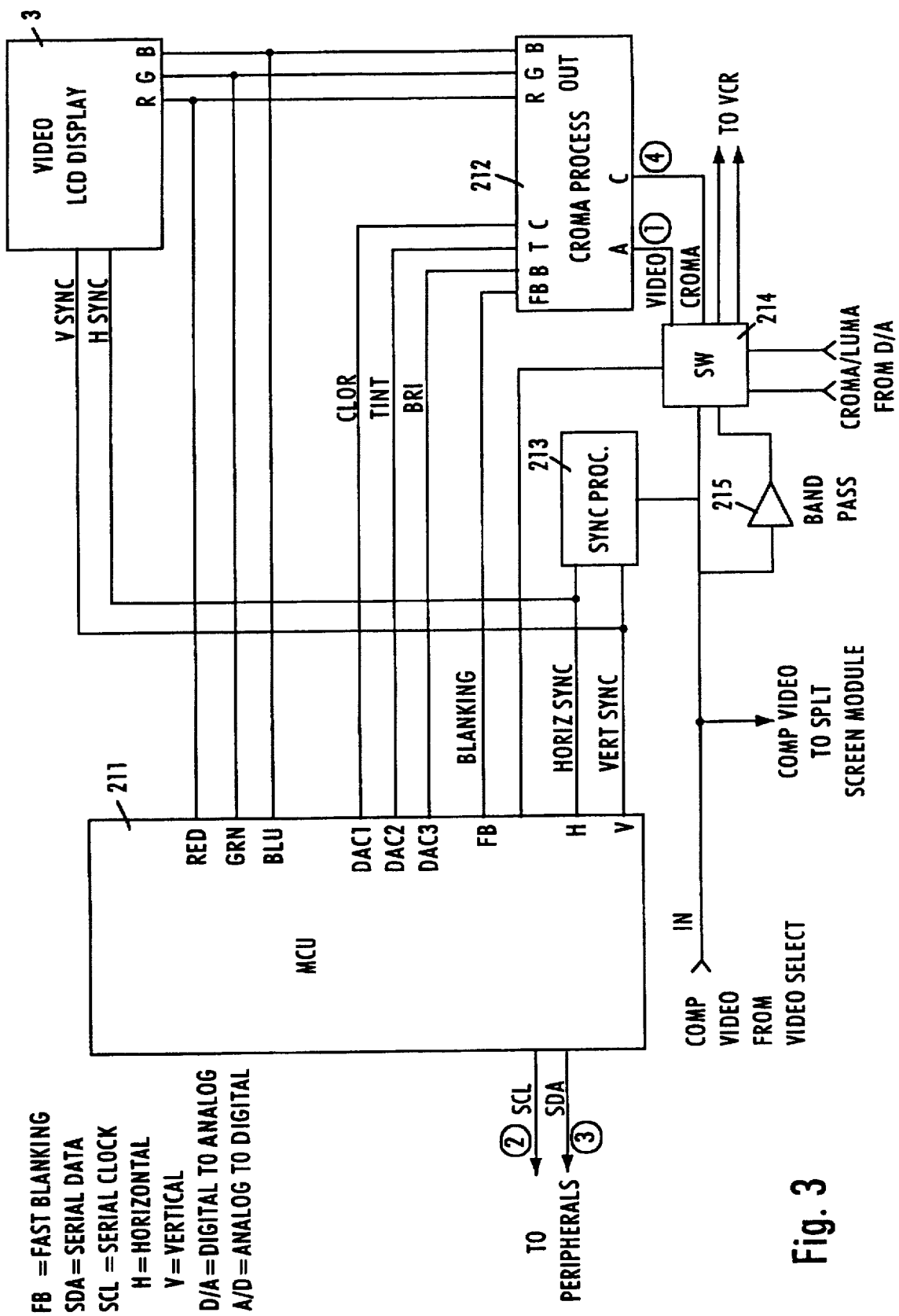
FIG. 3 is a circuit diagram depicting details of the CPU.
Figure 7A:
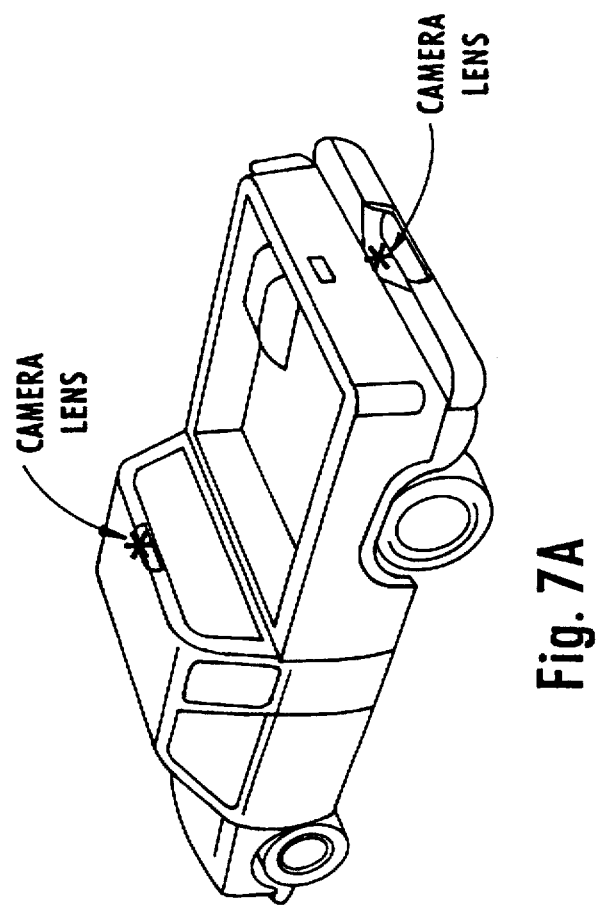
Figure 8D:
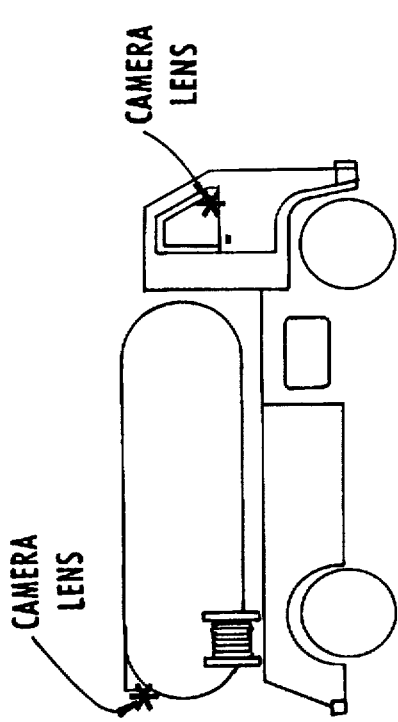
Figure 8C:
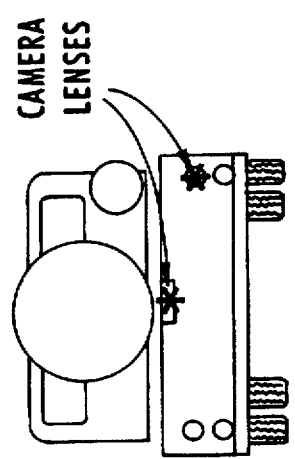
Figure 8B:
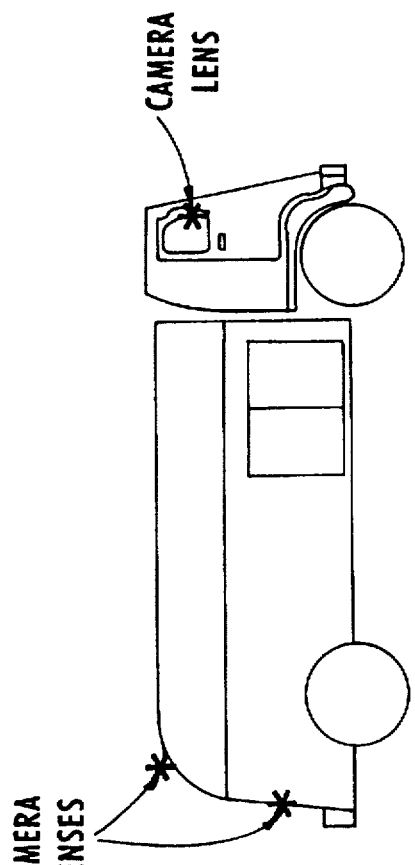
Figure 8A:
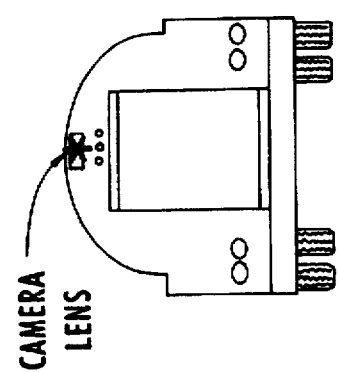
Figure 9B:
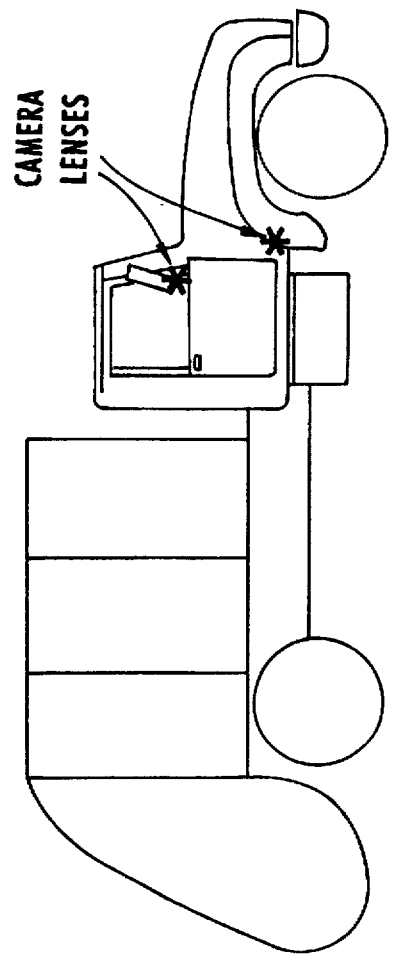
Figure 9A:
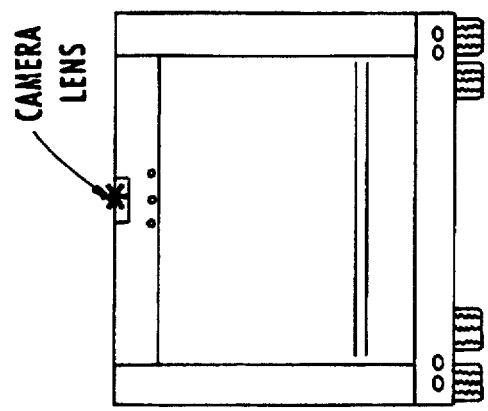
Figure 10A:
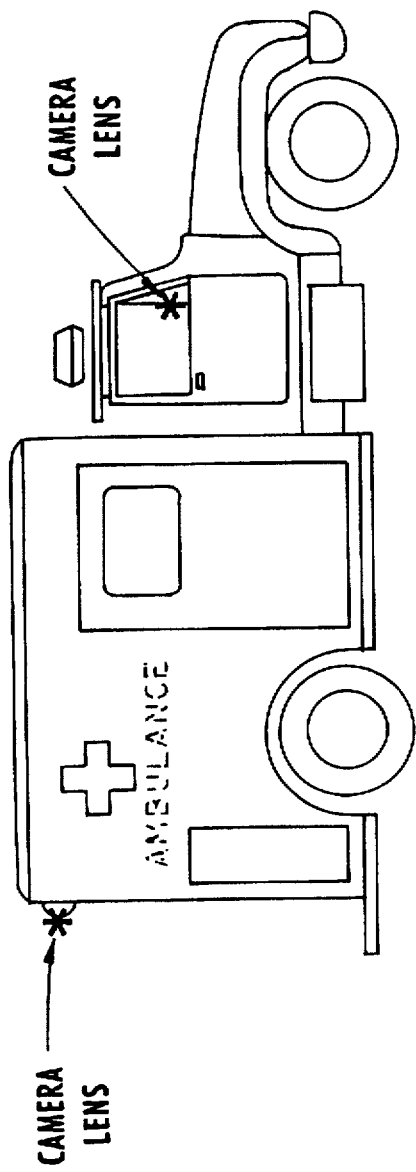
Figure 10B:
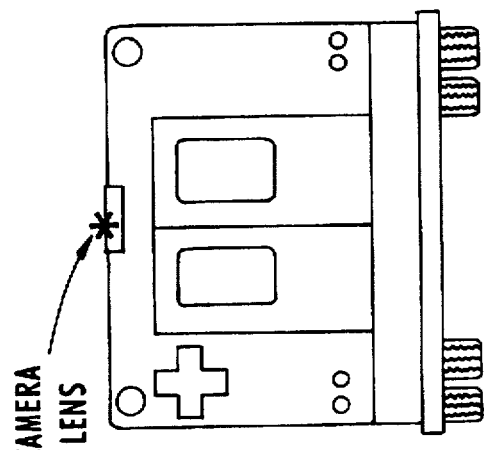
Figure 11A:
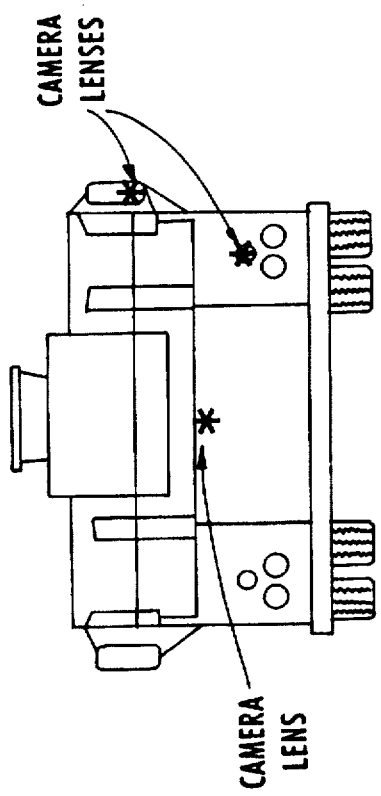
Figure 11B:
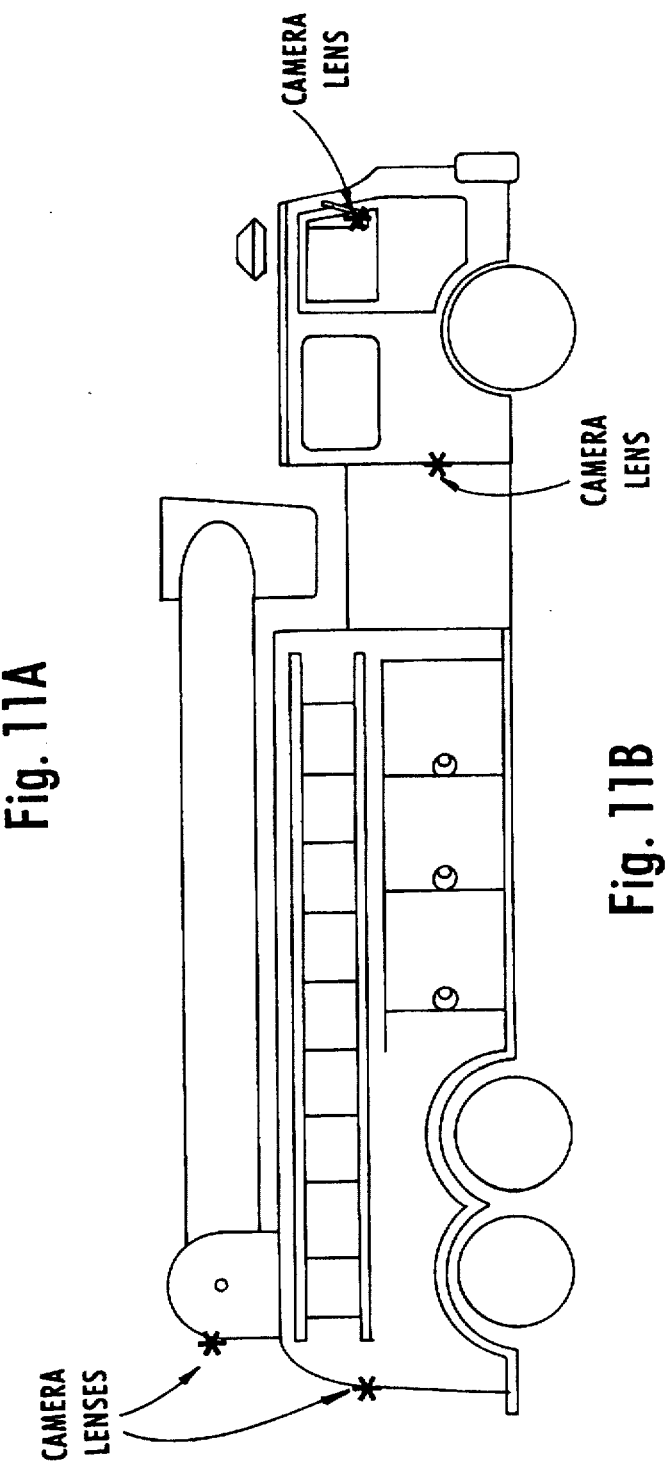
Figure 14:
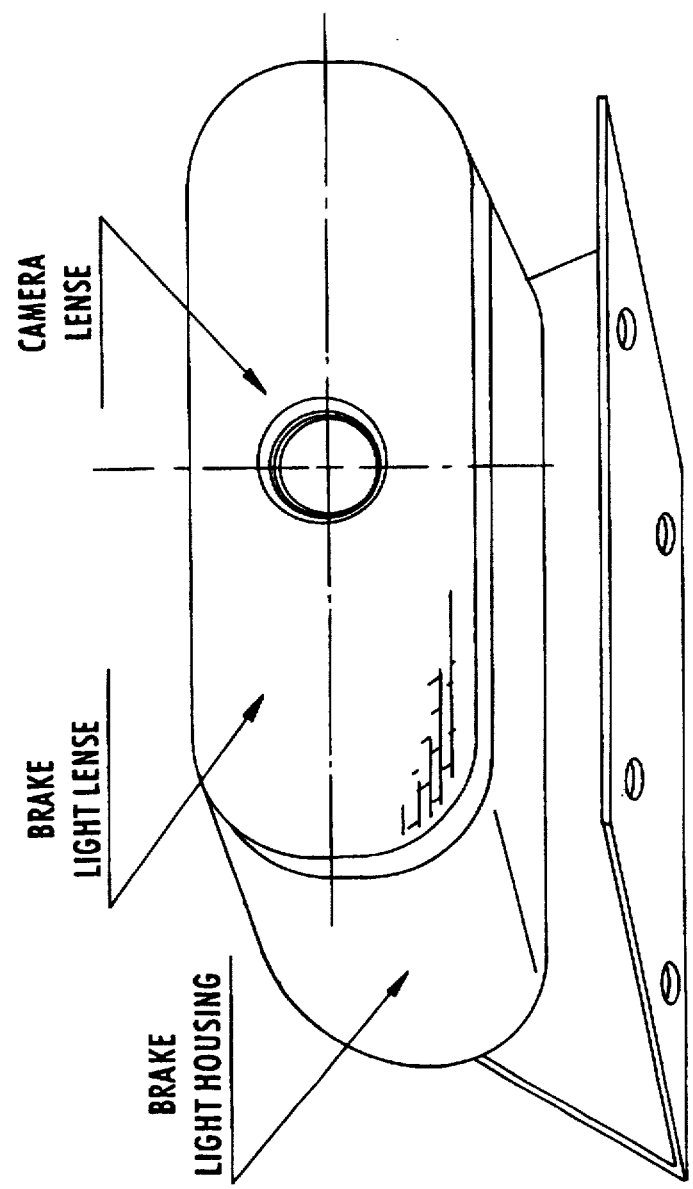
Figure 17:
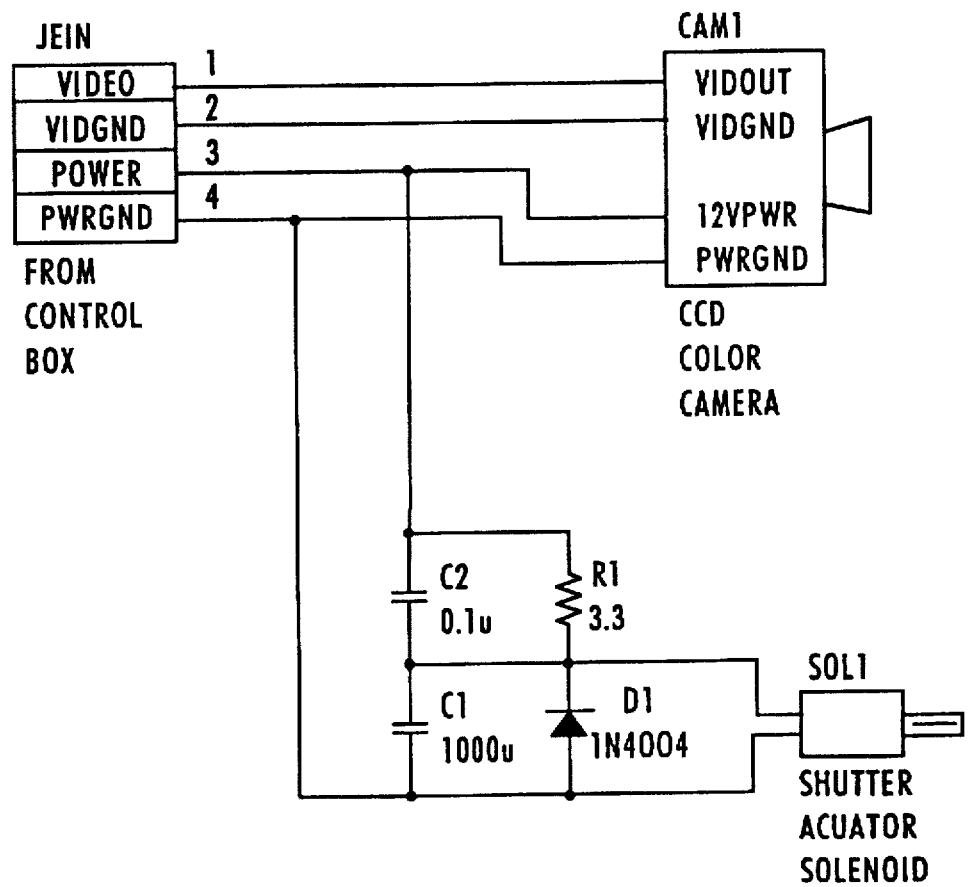
FIGS. 17–20 are wiring diagrams of one example for practicing the present invention.
Figure 18:
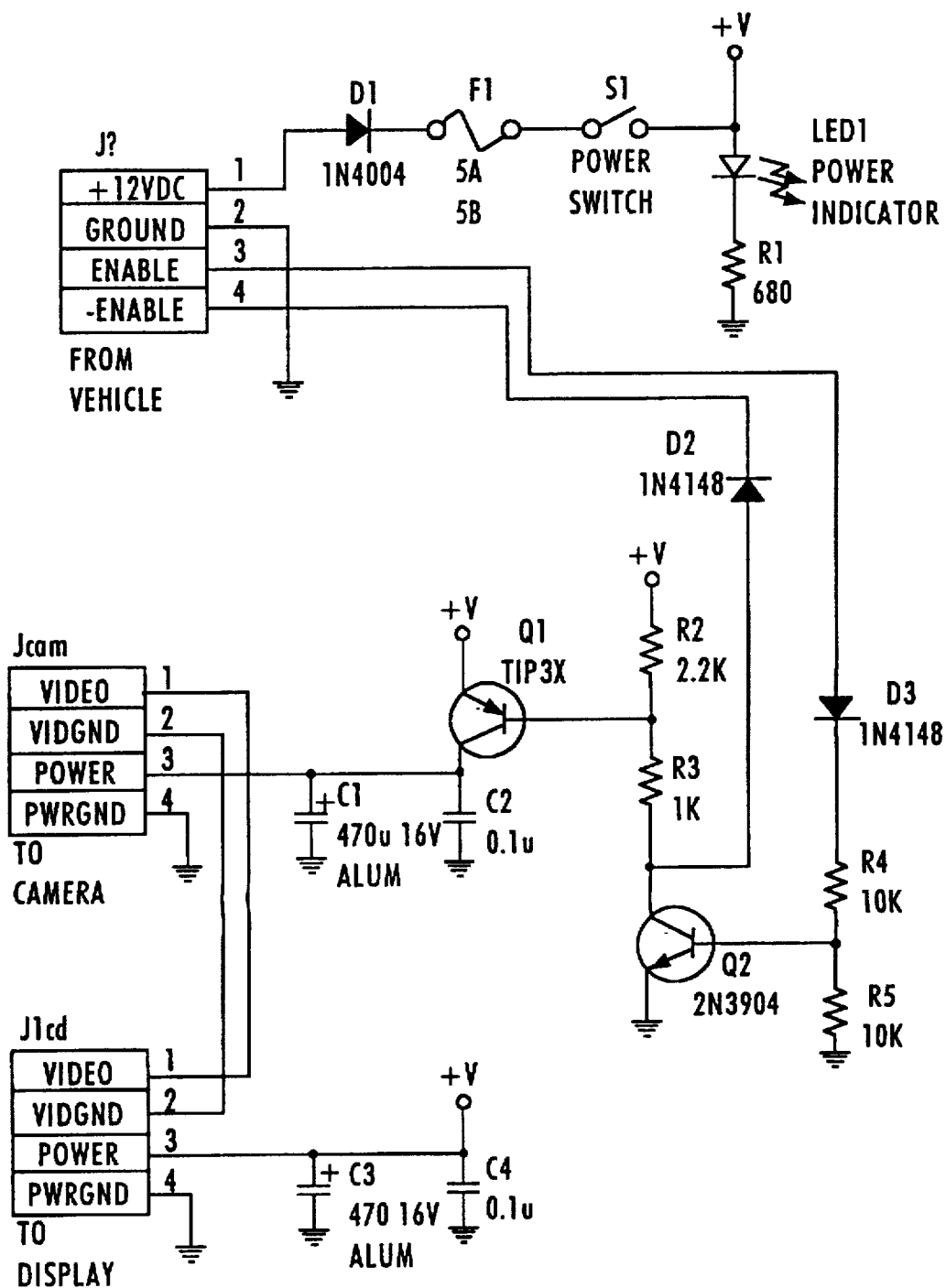
Figure 19:
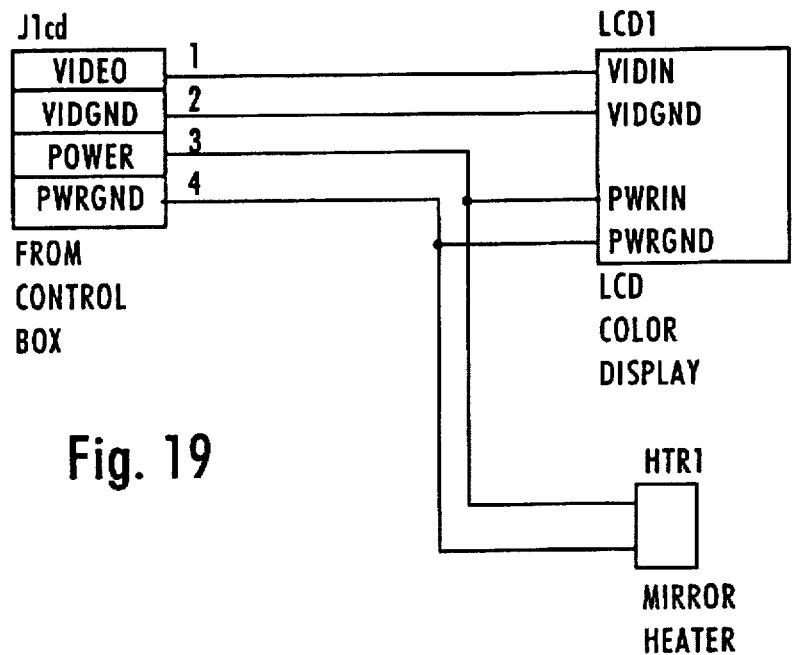
Figure 20:
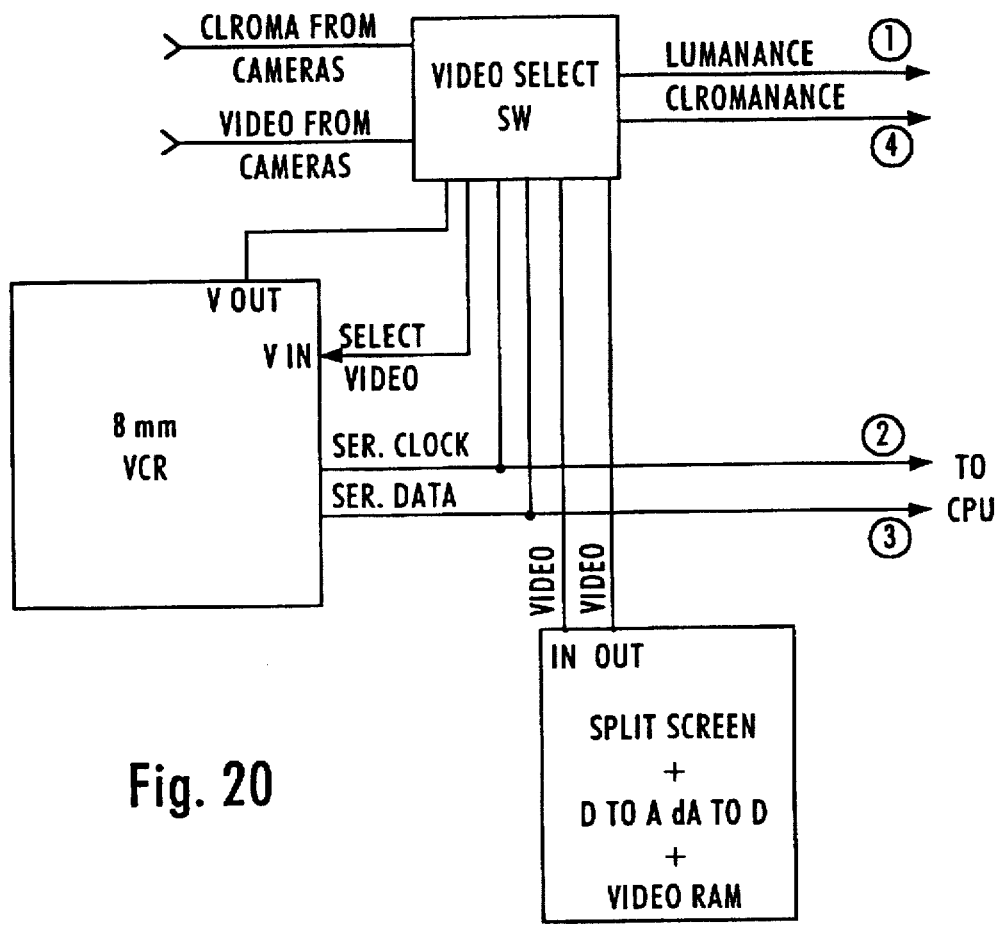

FIG. 3 depicts additional details of CPU 21. An additional sub-processor called an MCU and labelled 211 in FIG. 3 is part of CPU 21 of FIG. 2. MCU 211 determines which camera view will be displayed subject to operator controls or preprogamming. This device also routes composite video from the cameras to a chromaprocessor 212 through a video A/C converter 22 (in FIG. 2). The video is output from the chromaprocessor 212 as an RGB signal and is mixed with the graphics from MCU 211. The result is applied to the video LCD display 3. The use of range detection signals is also controlled by the MCU 211. Synchronizing of the signals throughout the arrangement shown in FIG. 3 as carried out by synchronous processor 213. The band-pass filter 215 is necessary for noise elimination while video selection switch 214 selects the image signals to be stored by the VCR.

The overall system is connected to the vehicle as indicated in FIG. 1 using connector group 4 to provide the proper ground, power and interface for response to vehicle operations.

It is noted that FIGS. 2 and 3 are illustrative examples only of one arrangement that can be used to carry out the present invention. Thus, while there have been described and illustrated several specific embodiments of the present invention, it is clear that variations and the details and the arrangements of the various embodiments possible may be made without departing from the true spirit and scope of the invention as defined in the appended claims. For example, different types of storage mechanisms could be used for the chrominance and luminance signals, rather than RAMs 24 and 25. Also, more than one video display could be placed integral to the side view mirror of a vehicle if the size and shape of the vehicle and its duty cycle justified the additional video display. Further, graphics depicting vehicle conditions, other than distance measurement, could also be combined with the video display of the present invention.

Although the present invention has been described and illustrated in detailed, it is clearly understood that the same as by way of illustration and example only, and is not to be taken by way of limitation. The spirit and scope of the present invention are limited only by the terms of the appended claims.

We claim:

1. A vehicular position monitoring system mounted on a vehicle, said system comprising:
   (a) means for generating an image;
   (b) a mirror having a reflecting surface with a window portion located therein;
   (c) a video display mounted on said mirror and viewable through said window portion;
   (d) a controller arranged to control connection of said means for generating an image to said video display so that said image is displayed; and
   (e) an audio detection device mounted external to said vehicle, and an audible alarm responsive to said audio detection device, said audible alarm arranged within said vehicle proximate to a location used by a vehicle operator.

2. The system of claim 1, wherein said audible alarm comprises a speaker conveying sound detected by said audio detection means.

3. The system of claim 1, wherein said means for generating an image comprise a charged coupled device.

4. A vehicular position monitoring system mounted on a vehicle, said system comprising:
   (a) means for generating an image, where said means for generating an image comprise a charged coupled device, said charge coupled device exhibiting an infrared sensitivity;
   (b) a mirror having a reflecting surface with a window portion located therein;
   (c) a video display mounted on said mirror and viewable through said window portion;
   (d) a controller arranged to control connection of said means for generating an image to said video display so that said image is displayed; and
   (e) an alarm responsive to a predetermined level of infrared radiation measured by said controller.

5. A vehicular position monitoring system mounted on a vehicle, said system comprising:
   (a) means for generating an image;
   (b) a mirror having a reflecting surface with a window portion located therein;
   (c) a video display mounted on said mirror and viewable through said window portion, wherein said video display comprises a color liquid crystal display, and said liquid crystal display comprises a multiple split-screen arranged to display four different images; and
   (d) a controller arranged to control connection of said means for generating an image to said video display so that said image is displayed as one of said four different images.

6. A vehicular position monitoring system mounted on a vehicle, said system comprising:
   (a) means for generating an image;
   (b) a mirror having a reflecting surface with a window portion located therein;
   (c) a video display mounted on said mirror and viewable through said window portion, wherein said video display comprises a color liquid crystal display, and said liquid crystal display comprises a multiple split-screen arranged to display four different images; and
   (d) a controller arranged to control connection of said means for generating an image to said video display so that said image is displayed, wherein said controller comprises means for switching images between the split screens of said video display responsive to a vehicle operator.

7. The system of claim 6, wherein said controller further comprises means for selecting video images for display responsive to vehicle operator activation of a keyboard.

8. The system of claim 7, wherein said controller further comprises means for displaying a menu on at least one of said split screens.

9. The system of claim 8, wherein said menu provides access to all operations of said system.

10. The system of claim 6, wherein said controller further comprises means for adding alpha-numeric graphics to said video images displayed by said liquid crystal device display.

11. The system of claim 10, further comprising an ultrasonic distance measurement system providing an output to said controller, said output of said ultrasonic distance measurement device being graphically represented on said liquid crystal display.

12. A vehicular position monitoring system, said system comprising:
   (a) an electronic camera having a field of view, for mounting on the vehicle such that the field of view is substantially external to the vehicle, and for generating an electrical signal representing an external image within the field of view of the camera;

(b) a mirror for mounting on the vehicle, said mirror having a reflecting surface;

(c) an electronic video display, mounted to said mirror for viewing concurrently therewith; and (d) a processor responsive to the electrical signal from the electronic camera for providing a drive signal to the electronic video display, and for causing the electronic video display to display the external image.

13. A vehicular position monitoring system as in claim 12, wherein the electronic camera comprises a charge coupled device (CCD).

14. A vehicular position monitoring system as in claim 12, wherein the electronic video display comprises a liquid crystal display (LCD).

15. A vehicular position monitoring system as in claim 12, wherein the electronic camera comprises:

an electronic imager for generating the electrical signal in response to light; and an optical fiber for picking up light from the external field of view and supplying that light to the electronic imager.

16. A vehicular position monitoring system as in claim 12, further comprising a fisheye lens for supplying light from the external field of view to an optical input of the electronic camera.

17. A vehicular position monitoring system as in claim 12, further comprising a second electronic camera.

18. A vehicular position monitoring system as in claim 17, wherein each of the electronic cameras comprises a charge coupled device (CCD).

19. A vehicular position monitoring system as in claim 17, wherein at least one of the electronic cameras is mounted in a vehicle tail light.

20. A vehicular position monitoring system as in claim 17, further comprising:

a swivel mount, for mounting one of the electronic cameras on the exterior of the vehicle to move the one camera to change direction of the field of view of the one camera; and a controller for enabling a vehicle operator to control rotational movement of the swivel mount.

21. A vehicular position monitoring system as in claim 12, wherein the reflective surface of the mirror has a window therethrough, and the electronic video display is mounted on the mirror for viewing through the window.

22. A vehicular position monitoring system as in claim 21, wherein said window is covered by an anti-glare surface.

23. A vehicular position monitoring system as in claim 21, wherein said window is covered by a pellicle.

24. A vehicular position monitoring system as in claim 23, wherein said electronic video display is visible through the window to a vehicle operator only when said electronic video display is activated.

25. A vehicular position monitoring system as in claim 12, further comprising a controller for activating the system to cause the electronic video display to display the external image when the vehicle is placed in reverse.

26. A vehicular position monitoring system as in claim 12, wherein the electronic camera comprises:

an electronic imager for generating the electrical signal in response to light;

a plurality optical fibers for picking up light from a plurality of different external fields of view; and shutters for selectively supplying light from each of the optical fibers to the electronic imager.

27. A vehicular position monitoring system as in claim 12, further comprising an image storage device.

28. A vehicular position monitoring system as in claim 27, wherein the image storage device comprises a video cassette recorder.

29. A vehicular position monitoring system as in claim 27, wherein the image storage device comprises a random access video memory chip.

30. A vehicular position monitoring system as in claim 12, further comprising:

an audio detection device for mounting external to said vehicle; and a transducer for producing an audible alarm in response to said audio detection device in the vehicle proximate an operator location.

31. A vehicular position monitoring system as in claim 12, wherein the electronic camera comprises an imager having an infrared sensitivity, said vehicular position monitoring system further comprising an alarm responsive to a predetermined level of infrared radiation sensed through said imager.

32. A vehicular position monitoring system as in claim 14, wherein said LCD comprises a multiple split-screen arranged to display a plurality of different images.

33. A vehicular position monitoring system as in claim 32, further comprising:

a second electronic camera having a second field of view, for mounting on the vehicle such that the second field of view is substantially external to the vehicle, and for generating a second electrical signal representing an external image within the second field of view;

wherein the processor selectively switches the first and second electrical signals to form the drive signal, to apply the images from the first and second fields of view in the split screens of the LCD, in response to input commands from the vehicle operator.

34. A method of providing a view external of a vehicle to an operator of the vehicle at an operator's location within the vehicle, comprising:

reflecting a first field of view from a mirror for viewing by the vehicle operator within the vehicle;

electronically imaging a second field of view, which is external to said vehicle;

producing an electrical drive signal representative of the electronically imaged second field of view;

electronically displaying an image of the second field of view, responsive to the drive signal, in close proximity to the reflection of the first field of view by the mirror, such that the vehicle operator can concurrently observe the first field of in the mirror and the electronically displayed image of the second field of view.

* * * * *